United States Patent Office 2,912,837
Patented Nov. 17, 1959

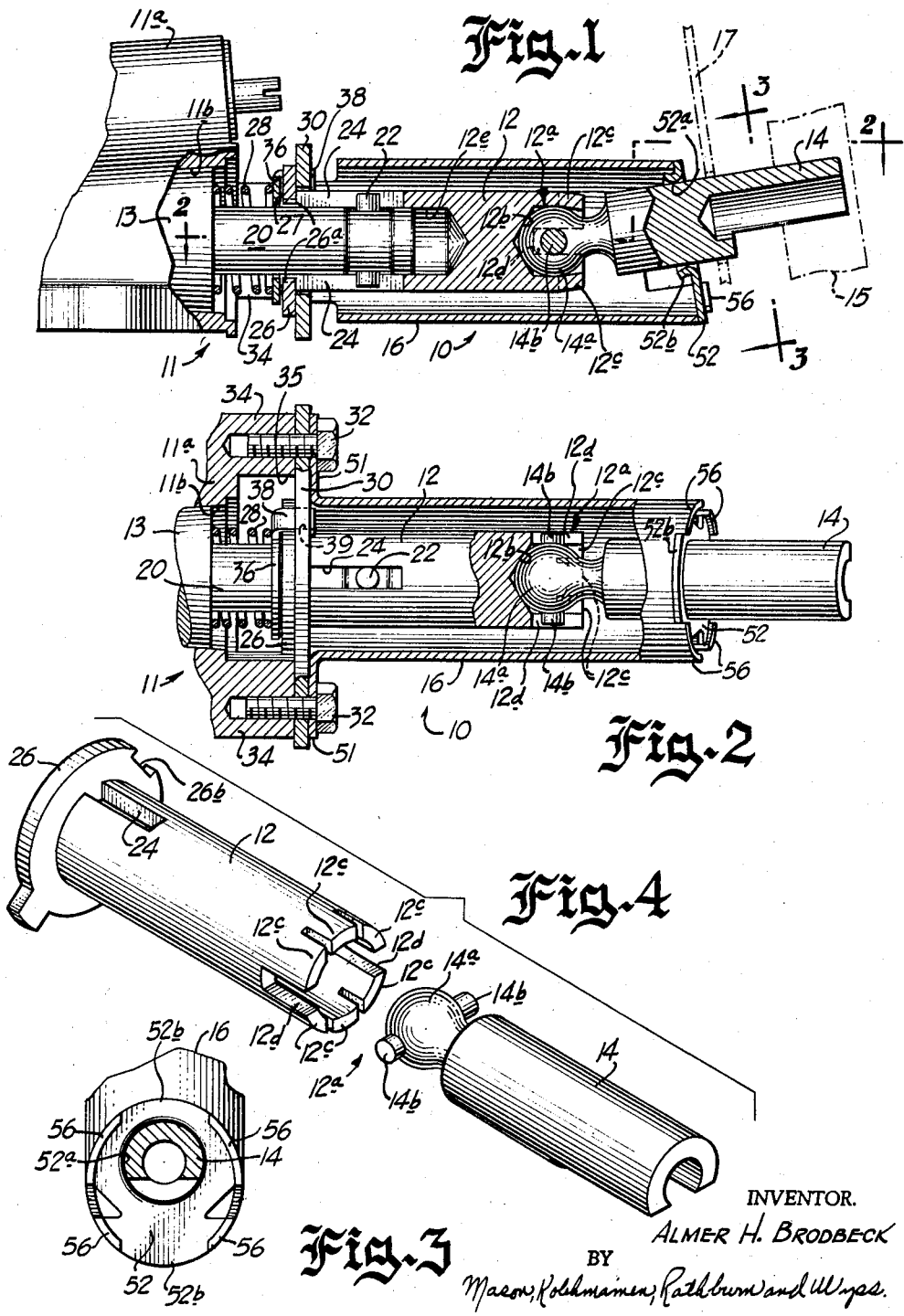

2,912,837

GAS VALVE STEM CONSTRUCTION

Almer H. Brodbeck, Evergreen Park, Ill., assignor to Harper-Wyman Company, Chicago, Ill., a corporation of Illinois Application January 20, 1958, Serial No. 710,078

1 Claim. (Cl. 64—7)

The present invention relates to gas valves and, more particularly, to a gas valve stem construction.

It is an object of the present invention to provide a new and improved gas valve stem construction.

It is another object of the present invention to provide a gas valve stem construction including separate stem portions disposed in angular axial relationship during rotation thereof.

It is another object of the present invention to provide a gas valve stem assembly including separate stem portions which are movable axially of a valve plug while remaining oriented in angular relation to each other.

It is a further object of the present invention to provide a gas valve stem construction including a pair of stem portions connected by a universal joint type rotatable driving connection and mounting means for both stem portions.

In brief, the gas valve stem construction of the present invention comprises a pair of stem portions interconnected for simultaneous rotation and, if desired, simultaneous generally axial movement as for valve unlocking purposes, by means of a universal type of joint and supporting means for the stem portions maintaining them substantially in predetermined axial relationship. For example, the one stem portion, which may be telescopically related to a valve or valve stem, is rotatable about a generally horizontal axis and a second stem portion may be rotatable about an axis inclined upwardly from the first axis. The one stem portion may be telescopically mounted on a valve stem portion rotatable about a horizontal axis. The second stem portion is connected to the first as by a ball and socket joint and supported by bearing means mounting it for rotation about the inclined axis and in such manner that it can be moved generally longitudinally to effect longitudinal movement of the first stem portion along its axis, as for valve unlocking purposes. The resulting construction provides in simple manner a structure in which the valve operating handle is not required to be located on the same axis as the valve. The construction is thus particularly suited for range constructions in which the handle projects through an inclined front panel.

Other objects and advantages of the present invention will become apparent from the following description of illustrative embodiments thereof, in accordance with which reference is had to the accompanying drawings in which:

Fig. 1 is an enlarged fragmentary side elevational view, shown partially in section, of a gas valve stem construction embodying the features of the present invention;

Fig. 2 is a generally axial cross sectional view of the valve stem construction taken along line 2—2 of Fig. 1;

Fig. 3 is a transverse cross sectional view taken along line 3—3 of Fig. 1; and

Fig. 4 is an exploded perspective view of a portion of the stem construction of Fig. 1 prior to assembly.

The gas valve stem construction of the present invention is indicated as a whole by the reference character 10. It is shown in conjunction with a gas valve 11 which may be of known type and which has been but fragmentarily illustrated. However, it may be of a locking type and include other features disclosed and claimed in the copending application of Charles C. Lamar, Serial No. 707,559, filed January 7, 1958. It should be understood that the valve may be of other types. For example, it need not be of the locking type.

The valve 11 includes a valve body 11a having a plug receiving chamber 11b within which is mounted a rotatable valve plug 13 rotatable about a first axis, which is shown to be a horizontal axis. The body is provided with generally diametrically spaced forwardly extending projections 34 providing a space 35 for a valve seating and locking means biasing spring 28 disposed between the valve plug and an end cap or plate 30 secured to the body projections by the screws 32.

As illustrated, the valve plug is rotatable through a stem construction comprising a stem portion 20 which may be formed integrally with the plug, another stem portion 12, which for convenience is called a first and inner stem portion because in a non-locking valve it could form an integral part of a portion of the plug, and a second and outer stem portion 14, to which is attached a valve operating handle 15.

In accordance with the present invention, the stem portions 12 and 14 are arranged so that their axes of rotation are disposed at an angle. As shown, the axis of stem portion 14 is inclined upwardly from the axis of stem portion 12. The result is a construction in which the stem portion 14 can be projected through an inclined panel 17 so that it is normal to the panel and so that the handle turns in a plane parallel to the panel.

The two stem portions are connected for simultaneous rotation through a universal joint indicated as a whole by reference character 12a. The joint is constituted by a socket 12b at the outer end of stem portion 12 and a ball 14a at the inner end of stem portion 14. The ball is movably held by bending over a pair of opposed finger-like end portions 12c of the socket defining structures. The rotary driving connection is constituted by a pin 14b extending through the ball 14a and projecting into slots 12d formed by adjacent socket fingers 12c, which are not bent.

The outer stem portion 14 is thus supported at its inner end by stem portion 12 and a second support is provided by a bearing plate 52 having an aperture 52a through which the stem portion projects and constituted by a rounded flange 52b. The plate and aperture are supported by a tube 16 surrounding the stem portion and secured to the valve body by the screws 32 which pass through the apertured outwardly extending flange 51 formed at the inner end of the tube. The size of the aperture is such as to nicely hold the outer stem portion for rotation and yet permit inward movement of it, which movement is required in a locking type of valve. The bearing plate 52 is suitably secured to the tube as by staking its radially outwardly extending flanges 52b relative to the spaced axial projections 56 of the tube.

In the locking type of valve illustrated the inner stem portion 12 is provided with a bore 12e slidably receiving the stem portion 20. The drive of portion 20 and the valve plug is effected by a pin and slot connection consisting of a pin 22 projecting through stem portion 20 and the opposed slots 24 in stem portion 12.

The locking means illustrated may be of the type shown in the Lamar application referred to above. It includes a locking washer drive and position limiting washer 26 secured as by peening 27 to the inner end of stem portion 12 and normally abutting against the inside of end plate 30. The washer 26 has opposed radially inwardly extending tongues 26a projecting into slots 24 to provide a good drive of the washer. The locking washer is indicated by reference character 36 and it is somewhat loosely mounted on stem portion 20 adjacent washer 36 but spaced from the latter by the peening 27. The lock washer is driven by washer 26 through a connection including the axially and forwardly extending locking tongue 38 fairly closely but movably fitting in a recess 26b in washer 26. The tongue 38 has a length such that in off position it projects into a locking recess 39 in the end plate.

From the foregoing detailed description it will be apparent that the valve stem of the present invention can be constructed and assembled readily. In operation the valve will ordinarily be in the off and locked position until it is desired to turn on the valve. In order to turn the valve on, it is necessary to move the stem portions 12 and 14 inwardly, which can be done readily as by pressing the valve handle 15 inwardly. When this is done the locking projection 38 is moved out of locking recess 39 whereupon the valve handle and valve can be turned. Upon turning, the locking projection 38 abuts against the inside of end plate 30. Thereafter the valve can be turned and left in any desired operative position. Upon removing the inwardly acting force, the valve stem returns to its outermost position. It should be noted that while the valve stem is constructed of several parts, the mounting is such that the parts remain in their desired angular orientation and that irrespective of the orientation, the valve can be unlocked and turned readily.

While the present invention has been described in connection with the details of a single embodiment, it should be understood that these details are intended to be illustrative and not limitative of the invention.

Having thus described my invention, what I desire to secure by Letters Patent of the United States is as follows:

A valve, including in combination, a valve body, a rotatable valve element in said body, a first valve operating stem portion axially movable and rotatable about a first axis for rotating said element, a second stem portion, a universal joint interconnecting said portions, an apertured plate constituting bearing means supporting said second stem portion for rotation about an axis located at an angle relative to said first axis, and a tubular element partially surrounding said second stem portion and secured to said body for supporting said bearing means from said body, said plate being mounted at the outer end of said tubular element in a plane normal to the axis of said second stem portion, and said bearing means supporting said second stem portion so that it can be moved lengthwise therein axially to move said first stem portion.

References Cited in the file of this patent

UNITED STATES PATENTS

| | | |
|---|---|---|
| 771,457 | Bullard | Oct. 4, 1904 |
| 1,022,909 | Whitney | Apr. 9, 1912 |
| 1,685,446 | Benedict | Sept. 25, 1928 |
| 2,219,591 | Hiester | Oct. 29, 1940 |
| 2,381,102 | Boyd | Aug. 7, 1945 |
| 2,509,426 | Fransen | May 30, 1950 |